US009881239B2

(12) United States Patent
Katoh

(10) Patent No.: US 9,881,239 B2
(45) Date of Patent: Jan. 30, 2018

(54) COMPUTER-READABLE RECORDING MEDIUM, INFORMATION PROCESSING DEVICE, AND INFORMATION PROCESSING SYSTEM

(71) Applicant: Yuhei Katoh, Kanagawa (JP)

(72) Inventor: Yuhei Katoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/252,317

(22) Filed: Aug. 31, 2016

(65) Prior Publication Data

US 2017/0068874 A1  Mar. 9, 2017

(30) Foreign Application Priority Data

Sep. 3, 2015 (JP) .................................. 2015-173988
Aug. 8, 2016 (JP) .................................. 2016-155481

(51) Int. Cl.
*G06F 3/12* (2006.01)
*G06K 15/02* (2006.01)
*G06K 15/00* (2006.01)

(52) U.S. Cl.
CPC ....... *G06K 15/1805* (2013.01); *G06F 3/1278* (2013.01); *G06F 3/1297* (2013.01); *G06K 15/402* (2013.01)

(58) Field of Classification Search
None
See application file for complete search history.

(56) References Cited

U.S. PATENT DOCUMENTS

| 6,184,998 B1* | 2/2001 | Tebeka | G06F 9/44505 358/1.13 |
| 2006/0221370 A1* | 10/2006 | Iida | G06F 9/4411 358/1.13 |
| 2008/0204805 A1* | 8/2008 | Ming | G06F 3/1205 358/1.16 |
| 2008/0260260 A1* | 10/2008 | Yamamoto | G06F 17/30256 382/209 |
| 2009/0025015 A1* | 1/2009 | Kurabayashi | G06F 8/64 719/327 |
| 2009/0268241 A1* | 10/2009 | Choi | G06F 3/1204 358/1.15 |
| 2010/0188680 A1* | 7/2010 | Xiao | G06F 3/1205 358/1.13 |

(Continued)

FOREIGN PATENT DOCUMENTS

JP  2012-059106  3/2012
JP  2014-211722  11/2014

*Primary Examiner* — Beniyam Menberu
(74) *Attorney, Agent, or Firm* — Harness, Dickey & Pierce

(57) ABSTRACT

A computer-readable recording medium includes an executable program stored thereon. The program instructs a computer to perform changing setting data for performing print control of a printing device to a value of customization setting to be stored in a storage unit; switching a piece of setting data used for printing among pieces of setting data of a plurality of printing devices stored in the storage unit into a piece of setting data of a printing device instructed to be switched; determining whether there is the customization setting to be invalidated in a type of the device after switching; and changing the customization setting to be invalidated to an alternative setting.

18 Claims, 14 Drawing Sheets

(56) References Cited

U.S. PATENT DOCUMENTS

| | | | |
|---|---|---|---|
| 2010/0218125 A1* | 8/2010 | Seki | H04N 1/00204 |
| | | | 715/762 |
| 2011/0069341 A1* | 3/2011 | Kim | G06F 3/1204 |
| | | | 358/1.15 |
| 2012/0044534 A1* | 2/2012 | Ichikawa | G06F 3/1204 |
| | | | 358/1.15 |
| 2012/0224222 A1* | 9/2012 | Kinoshita | G06F 3/1205 |
| | | | 358/1.15 |
| 2012/0327460 A1 | 12/2012 | Katoh | |
| 2015/0169267 A1* | 6/2015 | Hirakawa | G06F 3/1225 |
| | | | 358/1.13 |
| 2016/0105570 A1 | 4/2016 | Katoh | |

* cited by examiner

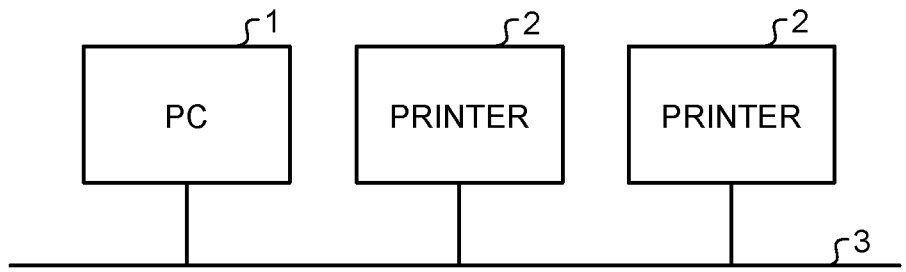
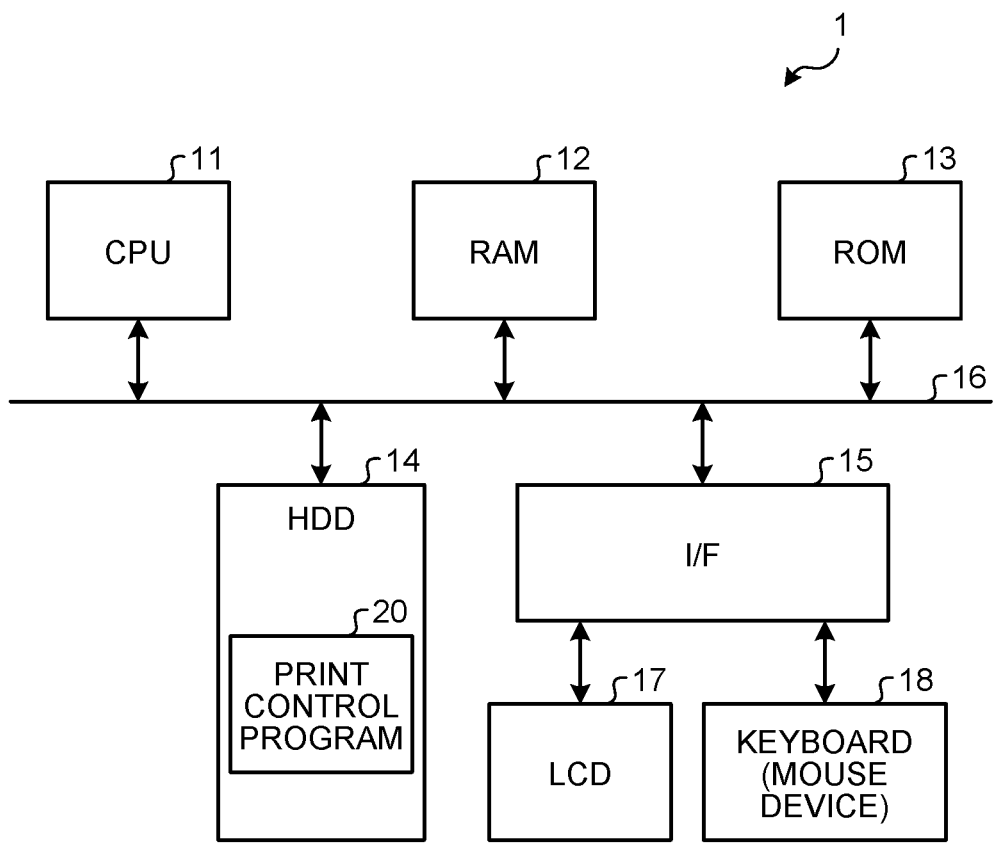

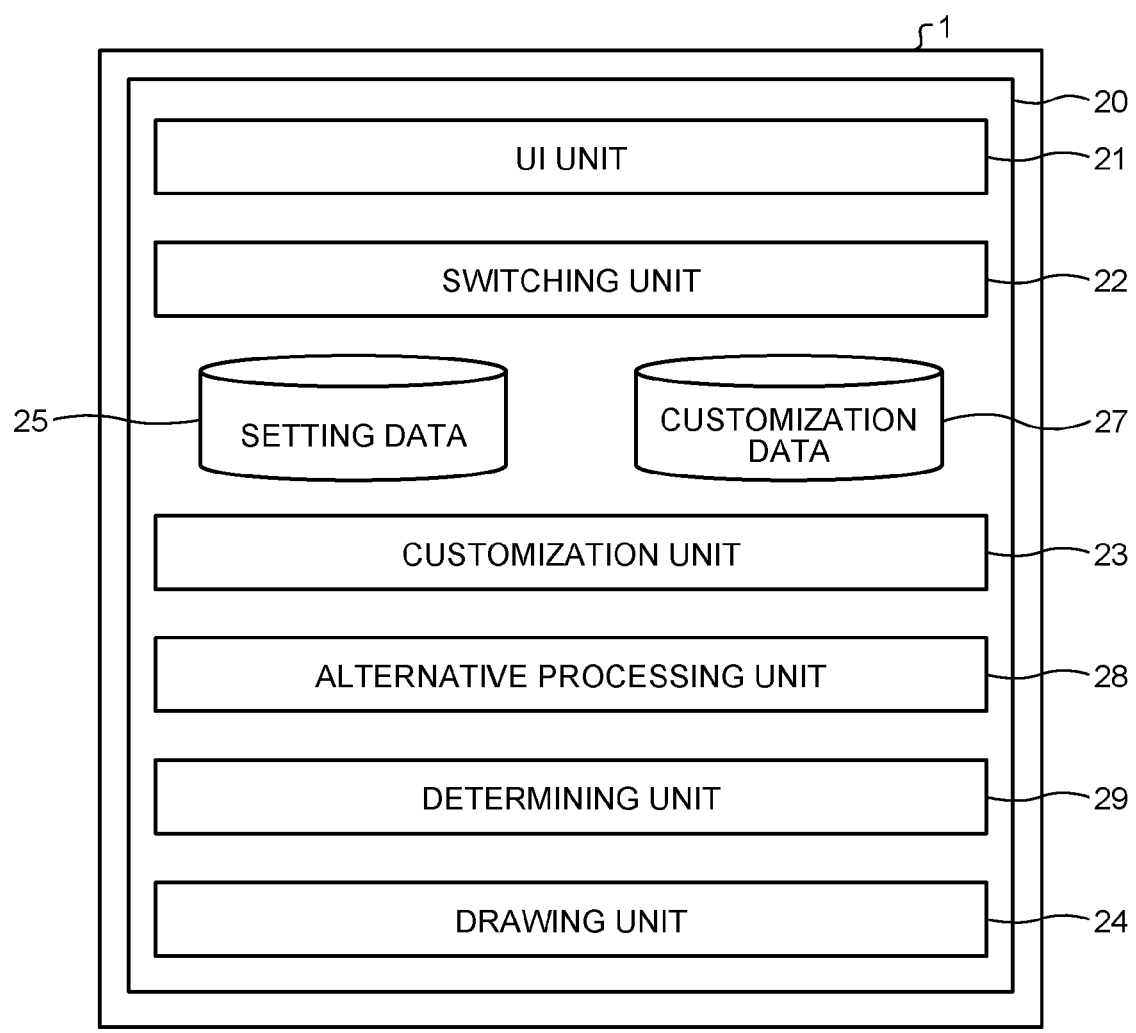

FIG.4

```
ModelA:
FUNCTION:
STAPLE:
 SET VALUE- NONE/UPPER LEFT/TWO ON LEFT/TWO ON UPPER SIDE/
 TWO ON RIGHT/TWO AT CENTER
 PROHIBITION-
  CANNOT BE SET WHEN STAPLE UNIT IS NOT MOUNTED
  "TWO ON RIGHT" CANNOT BE SET WHEN BOTH FACES ARE
  LEFT-OPENING
PUNCH:
 SET VALUE-NONE/TWO ON LEFT/TWO ON UPPER SIDE/TWO ON RIGHT
 PROHIBITION-
  CANNOT BE SET WHEN PUNCH UNIT IS NOT MOUNTED
  CANNOT BE SET WHEN "TWO AT CENTER" WITH STAPLE IS SET

OPTION:
 - STAPLE UNIT
 - PUNCH UNIT
```

FIG.5

```
ModelB:
FUNCTION:
STAPLE:
 SET VALUE- NONE/UPPER LEFT/TWO ON LEFT/
 TWO ON UPPER SIDE/TWO ON RIGHT
 PROHIBITION-
  CANNOT BE SET WHEN STAPLE UNIT IS NOT MOUNTED
  "TWO ON RIGHT" CANNOT BE SET WHEN BOTH FACES ARE
  LEFT-OPENING
PUNCH:
 SET VALUE-NONE/TWO ON LEFT/TWO ON UPPER SIDE/TWO ON RIGHT
 PROHIBITION-
  CANNOT BE SET WHEN PUNCH UNIT IS NOT MOUNTED

OPTION:
 - STAPLE UNIT
 - PUNCH UNIT
```

FIG.6
STAPLE (S):
 TWO POSITIONS AT CENTER ▼
PUNCH (P):
 NOT PERFORM ▼
FIG.7
STAPLE (S):
 UPPER LEFT ▼
PUNCH (P):
 NOT PERFORM ▼
NOT PERFORM
TWO POSITIONS ON LEFT
TWO POSITIONS ON UPPER SIDE

FIG.10

```
<?xml version="1.0" encoding="utf-8"?>
<rcf version="1.0">
    <featurelock>
        <item name="staple" fixvalue="topleftslant" alternative="staple:topleft"/>
        <item name="fold" fixvalue="rightzfold" usernotify="yes"/>
        <item name="duplex">
            <pickone name="longedgeleftortop"/>
            <pickone name="shortedgetoporleft"/>
        </item>
    </featurelock>
</rcf>
```

FIG.11

| ATTENTION | | | | ☒ |
|---|---|---|---|---|
| SETTING<br>SETTING TO BE INVALIDATED | | | | |
| SETTING NAME | SETTING NAME | CLASSIFI-CATION OF RELEASE | ALTERNATIVE SETTING | LOCKED/ NOT LOCKED |
| DUPLEX | LONG SIDE BINDING LOCKED (RIGHT-OPENING/ TOP-OPENING) | DIRECT | NOT PERFORM ▼<br>NOT PERFORM<br>LONG SIDE BINDING (LEFT-OPENING/TOP-OPENING)<br>LONG SIDE BINDING (RIGHT-OPENING/TOP-OPENING)<br>SHORT SIDE BINDING (TOP-OPENING/LEFT-OPENING)<br>SHORT SIDE BINDING (TOP-OPENING/RIGHT-OPENING) | NOT LOCKED |
| PUNCH | NONE LOCKED | INDIRECT | | LOCKED |
| | | | | OK |

FIG.15

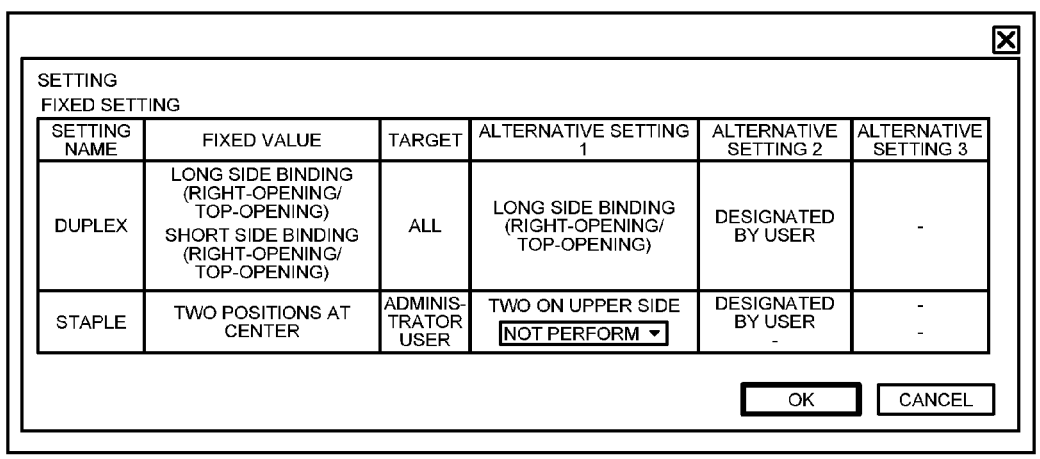

FIG.16

```
<?xml version="1.0" encoding="utf-8"?>
<rcf version="1.0">
    <featurelock>
        <item name="staple" fixvalue="topleftslant">
            <alternative>
                <user name="user1" setteing="staple:topleft"/>
                <user name="user2" setteing="staple:2atleft,staple:2attop"/>
                <default setteing="staple:2attop"/>
            </alternative>
        </item>
        <item name="fold" fixvalue="rightzfold">
            <alternative>
                <user privilege="administrator" usernotify="yes"/>
                <user privilege="user" setteing="fold:bottomzfold"/>
            </alternative>
        </item>
    </featurelock>
</rcf>
```

FIG.18

| FUNCTION | CONDITION | RESULT |
|---|---|---|
| COPY GUARD | NONE | - |
| WATERMARK | COPY GUARD = ON | FIXED TO BE OFF |
| DUPLEX PRINTING | NONE | - |
| BIDING | DUPLEX PRINTING = OFF | FIXED TO BE OFF |
| STAPLE | BINDING = OFF | ONLY "OFF" AND "TWO POSITIONS AT CENTER" ARE DISPLAYED |
| STAPLE | BINDING = ON | FIXED TO BE "TWO POSITIONS AT CENTER" |
| PUNCH | STAPLE = TWO POSITIONS AT CENTER | FIXED TO BE OFF |
| PUNCH | BINDING = OFF | FIXED TO BE OFF |
| TRAY | NONE | - |
| SHEET CLASSIFICATION | TRAY = SECOND TRAY | FIXED TO BE THICK PAPER |
| SHEET FOLDING PROCESSING | SHEET CLASSIFICATION = THICK PAPER | FIXED TO BE OFF |

FIG.19

| FUNCTION | CUSTOMIZATION CLASSIFICATION | VALUE |
|---|---|---|
| COPY GUARD | FIXED | ON |
| DUPLEX PRINTING | SETTING RANGE IS FIXED | LONG EDGE SHORT EDGE |
| STAPLE | SETTING RANGE IS FIXED | OFF TWO POSITIONS AT CENTER |
| TRAY | FIXED | SECOND TRAY |

COMPUTER-READABLE RECORDING MEDIUM, INFORMATION PROCESSING DEVICE, AND INFORMATION PROCESSING SYSTEM

CROSS-REFERENCE TO RELATED APPLICATIONS

The present application claims priority under 35 U.S.C. § 119 to Japanese Patent Application No. 2015-173988, filed Sep. 3, 2015; and Japanese Patent Application No. 2016-155481, filed Aug. 8, 2016. The contents of which are incorporated herein by reference in their entirety.

BACKGROUND OF THE INVENTION

1. Field of the Invention

The present invention relates to a computer-readable recording medium, an information processing device, and an information processing system.

2. Description of the Related Art

Today, known is a technique of customization for prohibiting a default value or a set value of print setting from being changed so that a document is not printed with a print setting other than the print setting of a printer driver managed by an administrator. Also known is a technique in which such customization is designated in a setting file or a registry to be reflected in a system.

Also known is a universal driver that can change the print setting in accordance with a printing device as a print destination when one print driver has information about a plurality of printing devices and the printing device that performs printing is changed. The universal driver can designate the print setting for each printing device, and change the print setting for each printing device. Conventional technologies are described in Japanese Unexamined Patent Application Publication No. 2014-211722, for example.

However, in the conventional universal driver, when the printing device that performs printing is changed, the print setting is invalidated between the printing device before the change and the printing device after the change.

For example, when a printing device in which a print sheet size is fixed to A3 size is changed to a printing device in which a maximum print sheet size is A4 size, printing cannot be performed on a print sheet of A3 size with the printing device after the change. In this case, a print setting of "fixing the print sheet size to A3 size" in the printing device before the change is invalidated in the printing device after the change.

Similarly, even when a setting of "obliquely stapling at an upper left position of a sheet (upper left oblique)" is designated in the printing device before the change, if the printing device after the change can perform only a setting of "stapling at an upper left position of the sheet (upper left)", the printing device after the change cannot support a staple setting of upper left oblique. In this case, the staple setting of upper left oblique in the printing device before the change is invalidated in the printing device after the change.

In this way, when the setting of the printing device before the change is invalidated in the printing device after the change, a user cannot recognize that the setting of the printing device before the change is invalidated without checking a print setting screen of the universal driver. Thus, the user performs printing while not knowing the setting of the printing device before the change is invalidated after the change. At a point when an intended printing result cannot be obtained, the user recognizes that the setting of the printing device before the change has been invalidated after the change.

Such a problem can be prevented by designating setting context for each printing device. However, when a version of the universal driver is updated, device types to be supported are increased. Accordingly, it is difficult to always support settings of all device types (combinations).

SUMMARY OF THE INVENTION

According to one aspect of the present invention, a non-transitory computer-readable recording medium includes an executable program stored thereon. The program instructs a computer to perform changing setting data for performing print control of a printing device to a value of customization setting to be stored in a storage unit; switching a piece of setting data used for printing among pieces of setting data of a plurality of printing devices stored in the storage unit into a piece of setting data of a printing device instructed to be switched; determining whether there is the customization setting to be invalidated in a type of the device after switching; and changing the customization setting to be invalidated to an alternative setting.

BRIEF DESCRIPTION OF THE DRAWINGS

FIG. 1 is a system configuration diagram of a printing system according to an embodiment;

FIG. 2 is a hardware configuration diagram of a personal computer device arranged in the printing system according to the embodiment;

FIG. 3 is a functional block diagram of a CPU of the personal computer device;

FIG. 4 is a diagram illustrating an example of device type data used in the printing system according to the embodiment;

FIG. 5 is a diagram illustrating another example of the device type data used in the printing system according to the embodiment;

FIG. 6 is a diagram for explaining an indirect customization setting in which a related punch setting is fixed in accordance with a staple setting;

FIG. 7 is a diagram illustrating a state in which the staple setting is invalidated by switching a device type, and the punch setting of the indirect customization setting is released;

FIG. 10 is a diagram illustrating an example of customization data used in the printing system according to the embodiment;

FIG. 11 is a diagram illustrating an example of a setting screen for selecting an alternative setting of the customization setting to be invalidated when the device type is switched;

FIG. 15 is a diagram illustrating another example of the setting screen for selecting an alternative setting of the customization setting to be invalidated when the device type is switched;

FIG. 16 is a diagram illustrating customization data for explaining an alternative setting for each user or each user privilege;

FIG. 18 is a diagram illustrating an example of prohibition information; and

FIG. 19 is a diagram illustrating an example of customization setting information.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 8:
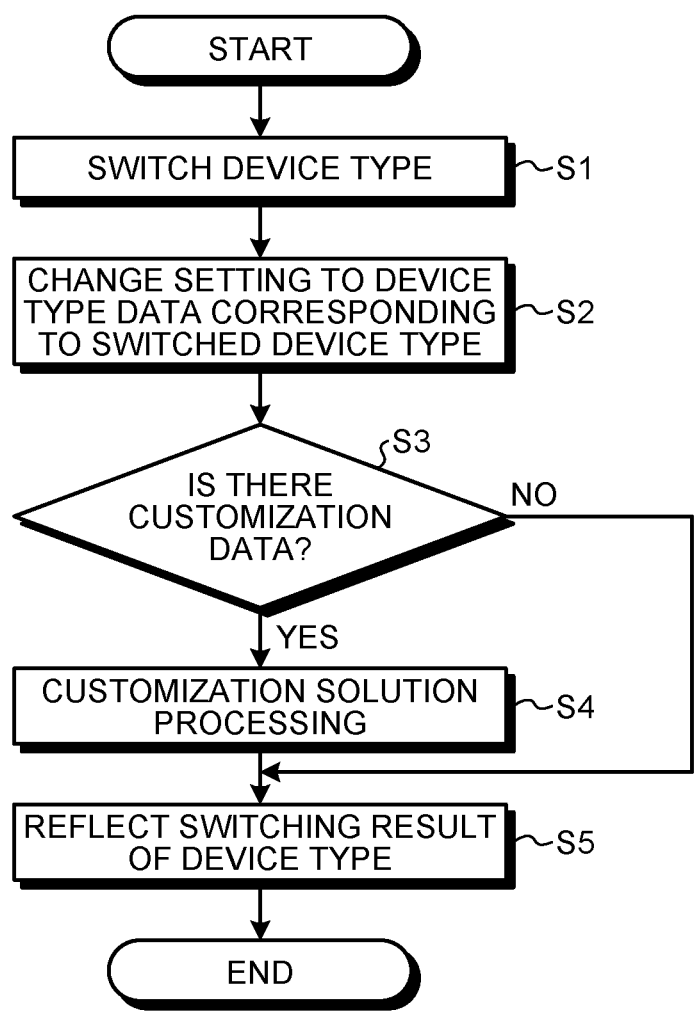
FIG. 8 is a flowchart illustrating the entire operation procedure of the printing system according to the embodiment to reflect a setting of device type before switching in a setting of device type after switching.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to provide a computer-readable recording medium, an information processing device, and an information processing system that prevent the problem that an unintended printing result is obtained when the printing device is changed.

First, FIG. 1 illustrates a system configuration diagram of a printing system according to an embodiment. As illustrated in FIG. 1, the printing system is formed by mutually connecting a (or a plurality of) personal computer device (PC) 1 and a plurality of (or a) printer devices 2 via a predetermined network 3 such as a local area network (LAN). The PC 1 and the printer device 2 may be connected to each other via another communication path such as a serial transmission line, a parallel transmission line, USB connection, and IEEE1394 connection.

FIG. 2 is a hardware configuration diagram of the PC 1. The PC 1 is formed by mutually connecting a central processing unit (CPU) 11, a random access memory (RAM) 12, a read only memory (ROM) 13, a hard disk drive (HDD) 14, and an interface (I/F) 15 via a bus line 16. A liquid crystal display (LCD) for performing display, a keyboard (and a mouse device) 18 for performing operation, and the like are connected to the interface 15.

The RAM 12 is a volatile storage medium capable of reading and writing information at high speed, and is used as a work area by the CPU 11 to process information. The ROM 13 is a non-volatile storage medium dedicated to reading, and stores therein a computer program such as firmware. The ROM 13 stores therein a control program such as an operating system (OS). The HDD 14 stores therein various application programs including a print control program 20. The CPU 11 controls the entire operation of the PC 1 based on the OS stored in the ROM 13. The CPU 11 performs print control of the printer devices 2 through the network 3 based on the print control program 20 stored in the HDD 14.

FIG. 3 is a functional block diagram of each function implemented when the CPU 11 executes the print control program 20 stored in the HDD 14 of the PC 1. As illustrated in FIG. 3, the print control program 20 functions as what is called a universal driver that enables print control and the like of a plurality of types of printer device 2. The print control program 20 includes a user interface unit (UI unit) 21, a switching unit 22, a customization unit 23, and a drawing unit 24.

Although the UI unit 21 to the drawing unit 24 are achieved by the CPU 11 through software in this example, part or all thereof may be achieved by hardware such as an integrated circuit (IC). The print control program 20 may be recorded in and provided as a file in an installable or executable format in a computer-readable recording medium such as a CD-ROM, a flexible disk (FD), a CD-R, a DVD, a Blu-ray Disc (registered trademark), or a semiconductor memory. The print control program 20 may be provided and installed through a network such as the Internet. The print control program 20 may be incorporated in advance and provided in, for example, a ROM in a device.

The UI unit 21 performs print setting to perform printing. The switching unit 22 acquires switching information of a device type used for printing supplied from a user and the like via the keyboard 18 when the printer device 2 used for printing is changed. The switching unit 22 switches (sets) a piece of setting data 25 used for printing to a piece of the setting data 25 of the device type indicated by the switching information among pieces of the setting data 25 stored in a storage unit such as the HDD 14. The drawing unit 24 converts print data from an application into a page description language (PDL) that can be handled by the printer device 2.

The setting data 25 is setting data for each printer device 2 supported. As described later, a function corresponding to the printer device 2 as a print destination is displayed, and exclusion processing of the function is performed, for example, based on the setting data 25.

The customization unit 23 generates customization data 27 in which the device type designated by the user and the like and the setting data 25 corresponding to the function are changed to be values designated by the user and the like, and stores the customization data 27 in a storage unit such as the HDD 14.

An alternative processing unit 28 and a determining unit 29 performs solution processing of customization content when the switching unit 22 switches the device type of the printer device 2. Specifically, when there is an invalidated customization setting, the alternative processing unit 28 makes notification to the user and performs application processing of alternative customization. The determining unit 29 refers to the setting data 25 and the customization data 27 to determine whether there is a customization setting that cannot be applied (determine whether there is a customization setting to be invalidated).

The customization data 27 is data indicating a setting designated by the user such as changing a default value, fixing a set value, and limiting the set value that can be set. The customization unit 23 reflects the customization data 27 in the setting for the printer device after the change. An administrator can prevent the problem that printing is performed with a print setting not intended by the administrator by applying and utilizing edited customization data.

FIGS. 4 and 5 illustrate an example of the setting data 25. FIG. 4 illustrates an example of device type data of the printer device 2 the device type of which is "ModelA". FIG. 5 illustrates an example of the device type data of the printer device 2 the device type of which is "ModelB". As illustrated in FIGS. 4 and 5, the setting data 25 includes information specific to the device type such as a function of each device type and an option indicating a unit that can be mounted on the printer device 2.

Specifically, in a case of the printer device 2 the device type of which is "ModelA" illustrated in FIG. 4, as a position at which stapling is performed, a desired stapling position can be selected from among "upper left", "two on left", "two on upper side", "two on right", and "two at center" in addition to a setting of "none" in which stapling is not performed. The setting such as "two on left" and "two on upper side" means a setting of stapling at two positions on the upper left of a sheet or a setting of stapling at two positions on the upper side of the sheet.

As a prohibition matter for a staple setting, it is indicated that the staple setting cannot be performed when a staple unit is not mounted. It is also indicated that the setting of "two on right" for stapling at two positions on the right of the sheet cannot be selected when both faces of the sheet are left-opening.

In the case of the printer device 2 the device type of which is "ModelA" illustrated in FIG. 4, as a position at which a punched hole is arranged, a desired position can be selected from among "two on left", "two on upper side", and "two on right" in addition to a setting of "none" in which the punched hole is not arranged.

As a prohibition matter for a punch setting, it is indicated that the punch setting cannot be performed when a punch unit is not mounted. It is also indicated that the punch setting cannot be performed when the staple setting of "two at center" is set.

In the case of the printer device 2 the device type of which is "ModelA" illustrated in FIG. 4, it is indicated that the staple unit and the punch unit can be mounted as an optional setting.

On the other hand, in a case of the printer device 2 the device type of which is "ModelB" illustrated in FIG. 5, as the stapling position, a desired stapling position can be selected from among "upper left", "two on left", "two on upper side", and "two on right" in addition to the setting of "none" in which stapling is not performed.

As a prohibition matter for the staple setting, it is indicated that the staple setting cannot be performed when the staple unit is not mounted. It is also indicated that the setting of "two on right" for stapling at two positions on the right of the sheet cannot be selected when both faces of the sheet are left-opening.

In the case of the printer device 2 the device type of which is "ModelB" illustrated in FIG. 5, as a position at which the punched hole is arranged, a desired position can be selected from among "two on left", "two on upper side", and "two on right" in addition to the setting of "none" in which the punched hole is not arranged.

As a prohibition matter for the punch setting, it is indicated that the punch setting cannot be performed when the punch unit is not mounted.

In the case of the printer device 2 the device type of which is "ModelB" illustrated in FIG. 5, it is indicated that the staple unit and the punch unit can be mounted as an optional setting.

Comparing FIG. 4 with FIG. 5, the printer device 2 of ModelA includes the staple setting of "two at center", but the printer device 2 of ModelB does not include the prohibition matter of "punch setting is not acceptable when the staple setting is "two at center"". By reading and applying such a setting specific to the device type when the device type of the printer device 2 is switched, setting screen display and exclusion processing corresponding to a held device type can be performed.

The following describes the problem that a customization setting indirectly performed by the user (indirect customization setting) is released. When a function present in the printer device 2 of the device type before switching is not present in the printer device 2 of the device type after switching, the indirect customization setting may be sequentially released when the device type of the printer device 2 is switched.

Specifically, as illustrated in FIG. 6 for example, when the staple setting is "two at center", the punch setting is automatically set to be "not perform" based on the prohibition matter as described above with reference to FIG. 4. In other words, the punch setting is exclusively set to be "not perform" with respect to the staple setting of "two at center". In further other words, when the user customizes the staple setting to be fixed at "two at center", a punch cannot be utilized at all times. Accordingly, a punch function is automatically set to be "not perform" similarly to a case in which the user performs customization setting so that the punch function is set to be "not perform" (indirect customization setting).

However, when the printer device 2 is switched to the device type not including the staple setting of "two at center", the customization setting of a staple function is invalidated, so that the indirect customization setting of the punch function is released, and a setting of the punch function may be enabled to be performed as illustrated in FIG. 7.

In the printing system according to the embodiment, if the indirect customization setting is released and a function on which the customization setting can be performed is generated when the device type of the printer device is switched, alternative setting is performed and notification is made to the user as the case may be. The following sequentially describes such an operation.

First, the flowchart in FIG. 8 illustrates the entire operation procedure for reflecting the setting of the device type before switching in the setting of the device type after switching. At Step S1, the switching unit 22 illustrated in FIG. 3 acquires, from the CPU 11, a change instruction from the user for the device type of the printer device 2 used for printing (or a change instruction from the system) supplied via the keyboard 18 and the CPU 11.

At Step S2, the switching unit 22 changes the setting of the device type before switching to the setting of the device type after switching by using the setting data 25. At Step S3, the customization unit 23 determines whether the setting designated by the user (customization setting) is present in the setting of the device type before switching.

If the customization setting is not present (No at Step S3), the customization setting by the user is not invalidated in the setting of the device type after switching. In this case, the process proceeds to Step S5, and the switching unit 22 directly reflects the setting of the device type before switching in the setting of the device type after switching. Accordingly, the process of the flowchart in FIG. 8 is ended.

If the customization setting is present in the setting of the device type before switching (Yes at Step S3), the alternative processing unit 28 and the determining unit 29 perform customization solution processing. Specifically, if the customization setting is present, the determining unit 29 uses the setting data 25 and the customization data 27 to determine whether there is a customization setting to be invalidated when the setting of the device type before switching is applied to the device type after switching.

If there is no customization setting to be invalidated, the process proceeds to Step S5, and the switching unit 22 directly reflects the setting of the device type before switching in the setting of the device type after switching. Accordingly, the process of the flowchart in FIG. 8 is ended.

If there is the customization setting to be invalidated, the determining unit 29 performs alternative processing of changing the customization setting to be invalidated to an alternative customization setting. Thereafter, the process proceeds to Step S5, and the switching unit 22 reflects, in the setting of the device type after switching, the setting of the device type before switching in which the alternative customization setting is reflected. Accordingly, the process of the flowchart in FIG. 8 is ended.

Figure 9:
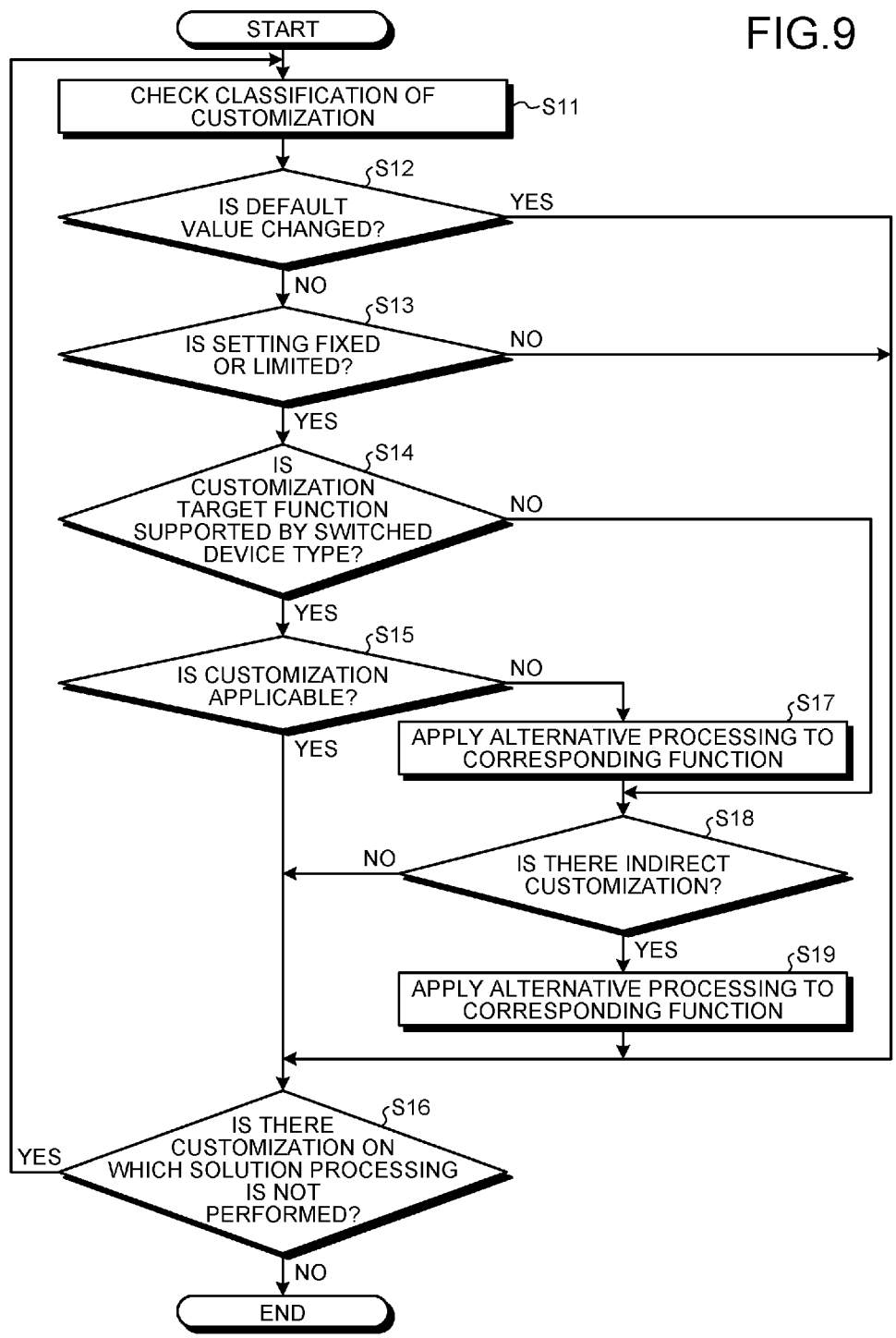
FIG. 9 is a flowchart illustrating a detailed processing procedure of customization solution processing.

Next, the flowchart in FIG. 9 illustrates a detailed processing procedure of the customization solution processing at Step S4. If it is determined that the customization setting designated by the user is present in the setting of the device type before switching at Step S3 of the flowchart in FIG. 8, the process proceeds to Step S11 of the flowchart in FIG. 9. At Step S11, the customization unit 23 checks a classification of the customization setting designated by the user in the setting of the device type before switching. At Step S12, the customization unit 23 determines whether the classification of the customization setting is the customization setting in which a default value is changed. At Step S13, the customization unit 23 determines whether the classification of the customization setting is the customization setting for fixing or limiting the setting.

Limitation of "user cannot set" is not imposed on the default value. Thus, at Step S12, if it is determined that the classification of the customization setting is the customization setting in which the default value is changed (Yes at Step S12), solution processing (described later) is not performed, and the process proceeds to Step S16.

At Step S12, if it is determined that the classification of the customization setting is not the customization setting in which the default value is changed (No at Step S12), the process proceeds to Step S13. At Step S13, the customization unit 23 determines whether the classification of the customization setting is the customization setting for fixing or limiting the setting. If it is determined that the classification of the customization setting is not the customization setting for fixing or limiting the setting (No at Step S13), the solution processing (described later) is not performed, and the process proceeds to Step S16. If it is determined that the classification of the customization setting is the customization setting for fixing or limiting the setting (Yes at Step S13), the process proceeds to Step S14 to perform solution processing.

At Step S14, the determining unit 29 of the customization unit 23 refers to the setting data 25 and the customization data 27 to determine whether the switched device type supports a customization target function. If the switched device type does not support the customization target function (No at Step S14), the process proceeds to Step S18. If the switched device type supports the customization target function (Yes at Step S14), the process proceeds to Step S15.

When it is determined that the switched device type supports the customization target function and the process proceeds to Step S15, the determining unit 29 refers to the setting data 25 and the customization data 27 to determine whether the customization setting indicated by the customization data 27 can be directly applied to the switched device type. If the customization setting can be applied (Yes at Step S15), the customization setting of the device type before switching can be directly applied to the device type after switching, so that the solution processing for customization is ended, and the process proceeds to Step S16.

When the switched device type does not support the customization target function, the indirect customization setting may be invalidated because the customization target function is not supported. Due to this, if the customization setting indicated by the customization data 27 cannot be applied to the switched device type and is invalidated (No at Step S15), the process proceeds to Step S17. At Step S17, the alternative processing unit 28 performs the following alternative processing on the customization setting to be invalidated. That is, at Step S17, the alternative processing unit 28 performs alternative processing for reflecting the customization data 27 for alternative processing stored in advance as the customization data 27 (refer to FIG. 10). Alternatively, the alternative processing unit 28 notifies the user that the indirect customization setting is to be invalidated, and urges the user to designate (select) the alternative processing (refer to FIG. 11).

FIG. 10 illustrates an example of the customization data 27 for alternative processing stored in advance in a storage unit such as the HDD 14 as the customization data 27. In a case of the printing system according to the embodiment, as the customization data 27, alternative setting information (alternative=staple: topleft) is stored in addition to the information of fixing or limiting the set value (fixvalue=topleftslant). That is, in this exemplified case, the alternative setting information of "stapling on the upper left (alternative=staple: topleft)" is stored in advance as the customization data 27 in place of a setting of "obliquely stapling on the upper left (fixvalue=topleftslant)". By storing (registering) such alternative setting information in advance as the customization data 27, the alternative setting information can be automatically applied when the customization setting is invalidated.

As described later, the alternative setting may be selected by the user, or validation and invalidation of the alternative setting may be enabled to be designated.

FIG. 10 exemplifies an alternative setting of "stapling on the upper left (alternative=staple: topleft)". A plurality of alternative settings may be set in priority order. For example, positions at which stapling is performed are designated in desired priority order as follows: "upper left"→"upper right-"→"invalidated" (alternative=staple: topleft, staple: righttop, ignore). In this case, in a case in which the customization setting of the device type before switching is invalidated when the device type is switched, the determining unit 29 of the customization unit 23 determines whether the stapling position is supported by the device type after switching in order of "upper left"→"upper right". When the device type after switching supports "stapling on the upper left", the determining unit 29 applies the alternative setting of "upper left" thereto. When the device type after switching supports "stapling on the upper right", the determining unit 29 applies the alternative setting of "upper right" thereto. When the device type after switching does not support any of "upper left" and "upper right", the determining unit 29 applies the alternative setting of "invalidated" thereto.

It may be optional whether the user is notified of an application result of the alternative setting. For example, in a setting of the example in FIG. 10, when the customization setting of sheet-folding (fold) for designating Z-folding (rightzhold) from the right side of the sheet is invalidated, notification is made to the user (usernotify=yes). When the notification is not made to the user, "usernotify=No" is set.

The customization setting of duplex printing (duplex) illustrated in FIG. 10 exemplifies a customization setting having a limited setting range. Specifically, in the example of FIG. 10, a printing direction is limited to any of "longedgeleftortop (long side left-opening)" and "shortedgetoproleft (short side left-opening)" in performing duplex printing, and a setting of "printing direction is not set (off)" cannot be selected.

For example, the alternative setting may be enabled to be designated by the UI unit 21 and the like other than the customization data 27. The customization data 27 may be designated by another external file, a registry, or the like.

Next, FIG. 11 illustrates an example of an alternative setting screen for notifying the user that the customization setting is to be invalidated and urging the user to designate (select) the alternative processing. FIG. 11 illustrates an example in which the customization setting of fixing a duplex setting to "long side binding (right-opening)" in the device type before switching is invalidated when the device type is switched. As illustrated in FIG. 11, the alternative processing unit 28 lists customization settings to be invalidated, and displays each original customization setting (in this example, "long side binding (right-opening/top-opening)") and the classification such as "direct" or "indirect" when the customization setting is released.

As illustrated in FIG. 11, the alternative processing unit 28 displays the invalidated customization setting, and urges the user to select the alternative setting. A pull-down menu of "not perform" to "short side binding (top-opening/right-opening)" illustrated in FIG. 11 is an example of the alternative setting for urging the user to select. The switching unit 22 reflects the alternative setting selected by the user in a print setting of the device type after switching.

In addition to fixing the setting, for example, designation can be made to limit a selection range so that only "long side binding (left-opening)" and "long side binding (right-opening)" can be selected. Designation can also be made to invalidate the customization setting.

If the customization setting is invalidated and the alternative processing is performed (Step S17), or if a corresponding function is not supported by the device type after switching (No at Step S14), the determining unit 29 determines, at Step S18, whether there is a function on which the customization setting is indirectly performed and that is present in the device type before switching. That is, when the staple setting is "two at center", the punch setting of the punch function as a related function of the staple function is automatically (exclusively) set to be "not perform". At Step S18, the determining unit 29 determines whether there is an "indirect customization setting" that is indirectly set when the customization setting is performed on one of the functions. If it is determined that the indirect customization setting is not present (No at Step S18), the process proceeds to Step S16. If it is determined that the indirect customization setting is present (Yes at Step S18), the process proceeds to Step S19.

The determining unit 29 determines whether the indirect customization setting is present using "customization setting information of the device type before switching", "device type data of the device type before switching such as function support information and related information among the functions", and "device type data of the device type after switching such as function support information and related information among the functions".

Specifically, cases in which the indirect customization setting is determined are different depending on a type of the customization setting. That is, in a case of a setting that is always excluded when the setting is fixed, the determining unit 29 determines that the setting is the indirect customization setting (case A). In a case of a setting that is always excluded within a settable range, the determining unit 29 determines that the setting is the indirect customization setting (case B). In a case of a setting that can be released from exclusion within a settable range, the determining unit 29 determines that the setting is not the indirect customization setting (case C).

For example, it is assumed that a binding function cannot be set to be ON except when a duplex printing function is OFF. In this case, when a duplex printing setting is fixed to long side opening (longedge), the binding function always cannot be set to be ON. Thus, the determining unit 29 determines an ON setting of the binding function in this case to be the indirect customization setting (=the case A described above). If the setting range of the duplex printing setting is limited to the long side opening (longedge) or the long side opening (shortedge), the binding function cannot be set in both cases. Thus, the determining unit 29 determines the ON setting of the binding function in this case to be the indirect customization setting (=the case B described above). When the duplex printing setting is set to be OFF and the setting range is limited to long side opening (longedge), the ON setting of the binding function is enabled by setting the duplex printing function to be OFF. Thus, the determining unit 29 determines the ON setting of the binding function in this case not to be the indirect customization setting (=the case C described above).

When the customization setting of the device type before switching is not supported by the device type after switching, the determining unit 29 determines that the customization setting is invalidated. In this case, the device type after switching does not include the setting data 25 corresponding to the customization setting of the device type before switching, so that the determining unit 29 performs the determination described above with reference to the setting data 25 of the device type before switching.

Figure 12:
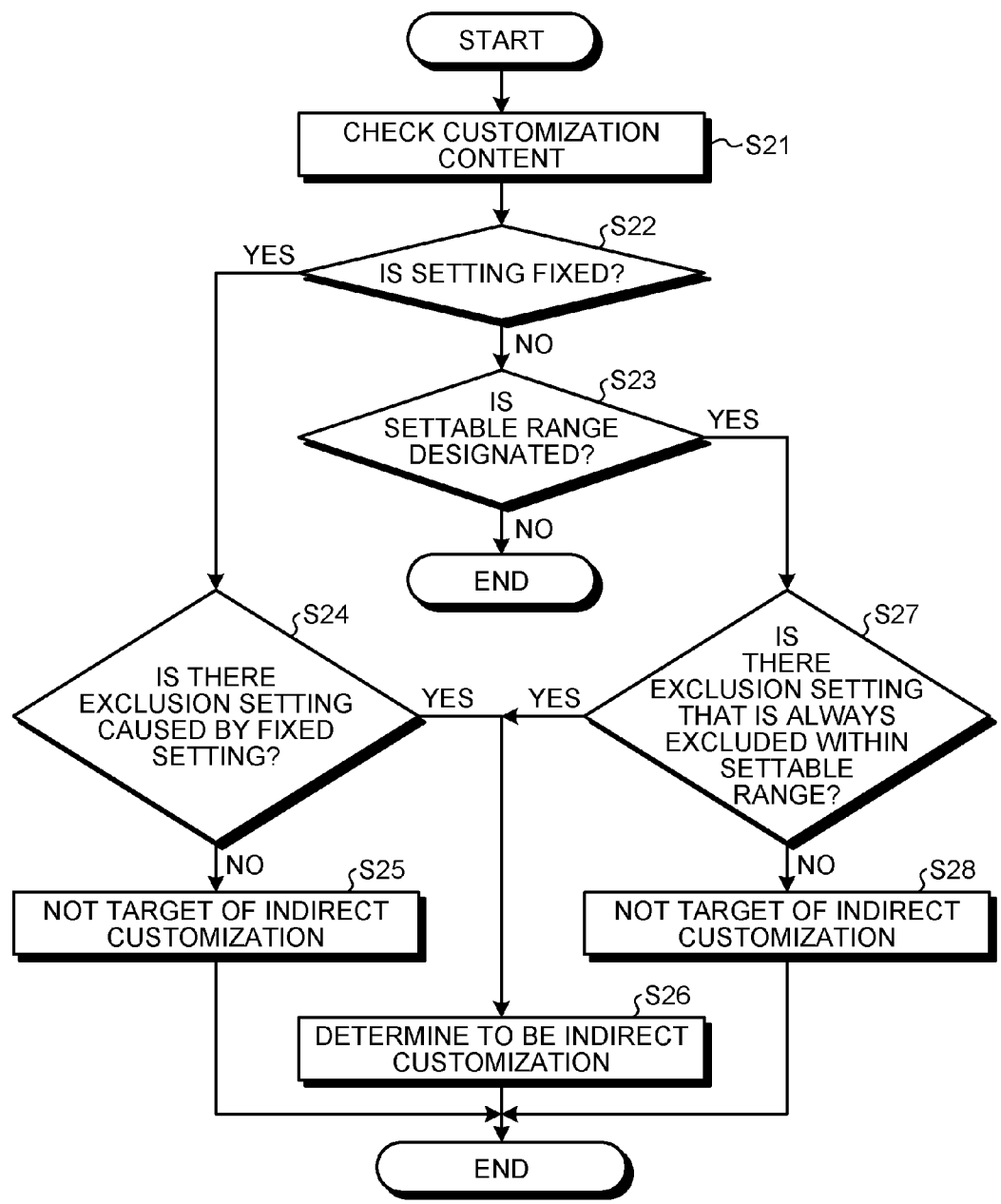
FIG. 12 is a flowchart illustrating a determination processing procedure of the indirect customization setting.

FIG. 12 is a flowchart illustrating a determination processing procedure of such an indirect customization setting. At Step S21, the determining unit 29 checks each piece of content of the customization setting of the device type before switching. At Step S22, the determining unit 29 determines whether the checked customization setting is a fixed setting. If the customization setting is determined to be the fixed setting (Yes at Step S22), the process proceeds to Step S24.

At Step S24, the determining unit 29 refers to the setting data 25 and the customization data 27 of the device type before switching to determine whether there is an exclusion setting that is always excluded due to the fixed setting. If it is determined that there is no exclusion setting that is always excluded due to the fixed setting, the determining unit 29 determines that the setting is not a target of indirect customization at Step S25. If it is determined that the setting is not a target of indirect customization, the determining unit 29 does not perform any processing.

If it is determined that there is an exclusion setting that is always excluded due to the fixed setting, the determining unit 29 determines the setting to be the indirect customization setting at Step S26. For example, in a case in which the punch setting other than "none" is prohibited when the staple setting is "two positions at center", the determining unit 29 determines that there is an indirect customization setting of "none" even if there is no customization setting in the punch setting.

If it is determined that the checked customization setting is not the fixed setting at Step S22 (No at Step S22), the determining unit 29 determines whether the checked customization setting is the customization setting having a fixed setting range at Step S23. If it is determined that the customization setting does not have a fixed setting range, the determining unit 29 ends the process in the flowchart of FIG. 12 as it is. If it is determined that the customization setting has a fixed setting range, the determining unit 29 advances the process to Step S27.

At Step S27, the determining unit 29 refers to the setting data 25 and the customization data 27 before switching to determine whether there is an exclusion setting that is always excluded because the setting range is limited. Settings generated when the setting range is limited include an "exclusion setting that is always excluded within a settable range (first pattern)" and a "setting that can be released from exclusion within a settable range (second pattern)". By way of example, the determining unit 29 determines whether there is the "exclusion setting that is always excluded within a settable range (first pattern)" at Step S27.

For example, in a case in which the ON setting of the binding function is prohibited except when the duplex printing function is OFF, and the setting range of the duplex printing function is limited to "long side binding, short side binding", the ON setting of the binding function is prohibited in both settings of "long side binding" and "short side binding". Thus, at Step S26, the determining unit 29 determines that the ON setting of the binding function in this case is the indirect customization setting (first pattern).

In contrast, when the duplex printing function is set to be OFF and the range is limited to long side binding, the ON setting of the binding function is enabled, so that the determining unit 29 determines that the setting of the binding function in this case is not a target of the indirect customization setting at Step S28 (second pattern).

If it is determined that the setting is the indirect customization setting, the process proceeds to Step S19 in the flowchart of FIG. 9. At Step S19, the alternative processing unit 28 performs alternative processing for reflecting the customization data 27 for alternative processing stored in advance as the customization data 27 (refer to FIG. 10). Alternatively, the alternative processing unit 28 notifies the user that the indirect customization setting is invalidated, and urges the user to designate (select) the alternative processing (refer to FIG. 11).

When there are a plurality of customization settings, the customization unit 23 performs the solution processing on all of the customization settings. At Step S16, the customization unit 23 determines whether there is a customization setting on which such solution processing is not performed (determines whether there remains a customization setting on which solution processing is not performed). If there remains the customization setting on which solution processing is not performed (Yes at Step S16), the customization unit 23 returns the process to Step S11, and repeatedly performs the solution processing described above. If there remains no customization setting on which solution process-ing is not performed (No at Step S16), the customization unit 23 ends the process of the flowchart in FIG. 9.

Figure 13:
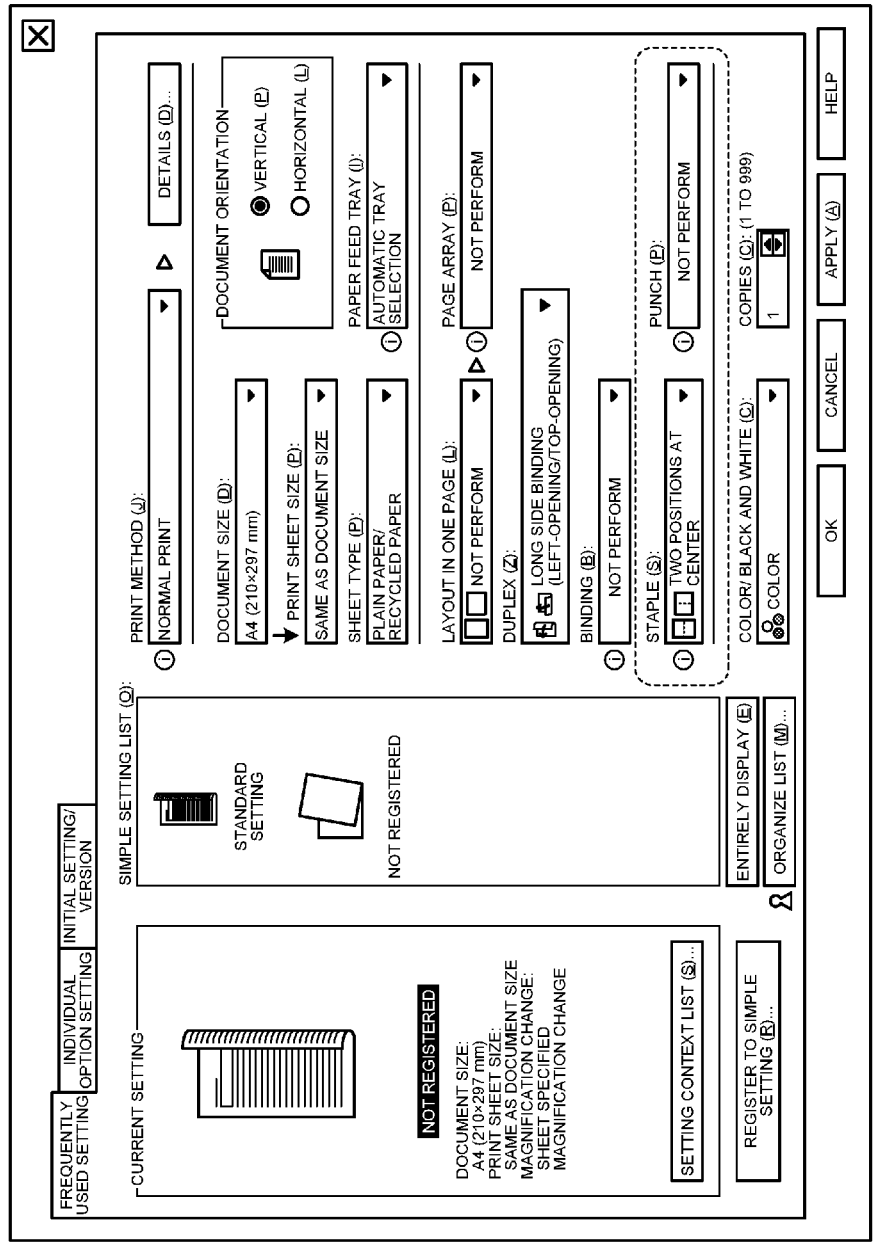
FIG. 13 is a diagram illustrating an example of a print setting screen before the device type is switched.

FIG. 13 illustrates a setting screen before the device type is switched. As is clear from a portion surrounded by a frame of a dotted line in FIG. 13, when the customization setting is performed to fix the staple setting to "two at center" before the device type is changed, the punch setting is exclusively set to be "not perform".

Figure 14:
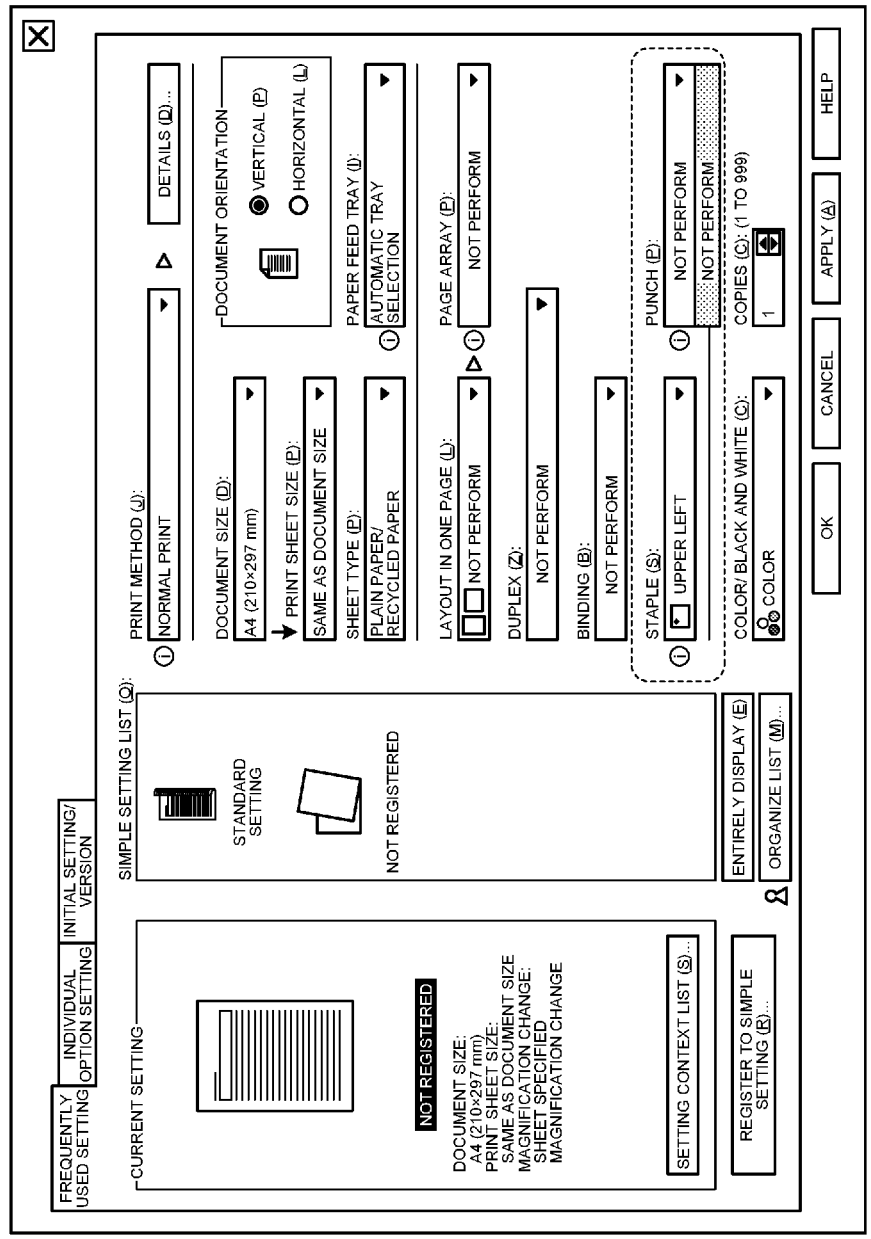
FIG. 14 is a diagram illustrating an example of the print setting screen after the device type is switched.

FIG. 14 illustrates the setting screen after the device type is switched. In the example illustrated in FIG. 14, the device type after switching does not include the staple setting of "two at center". When the device type is switched to a device type not including the staple setting of "two at center", the customization setting of the staple function is invalidated in the related art, so that the exclusion setting of the punch function is released and the punch function is disadvantageously enabled to be settable.

However, in the printing system according to the embodiment, although the staple function of "upper left" is alternatively set instead of the staple setting of "two at center" as illustrated by being surrounded by a frame of the dotted line in FIG. 14, the punch function as the exclusion setting is not released and can be maintained to be "not perform" in this case. This configuration can prevent the problem that the user performs printing without knowing that the customization setting before change is invalidated after the change, and an intended printing result cannot be obtained.

FIG. 15 illustrates an example of the setting screen for designating the alternative setting described above. The user designates, via the setting screen, the alternative setting for the fixed customization setting that has been previously designated. In the example of FIG. 15, the customization setting having a fixed setting range is duplex (fixed to selection from the long side and the short side), and the customization setting having a fixed set value is the staple setting of "two at center". The user sets a target user such as "all users" and "administrator" via the setting screen. The user sets the alternative settings such as "long side binding (right-opening)/(top-opening)", "two on upper side", and "designated by user" as the first to third alternative settings in desired priority order via the setting screen.

Next, the following describes an example of designating a format of the customization data by the user with reference to FIG. 16. The example illustrated in FIG. 16 is a designation example in a case of dividing an operation for each user name and each user privilege in addition to designation of the alternative setting described with reference to FIG. 10. Thus, syntax for designation described with reference to FIG. 10 is different from syntax for designating the alternative setting.

Specifically, in the example of FIG. 16, <item> tag for designating the customization setting having a fixed set value includes <alternative> tag indicating the alternative setting as a child element. In this example, the alternative setting "for each user" is designated for the customization setting of the staple (staple), and the alternative setting "for each privilege" is designated for the customization setting of sheet-folding (fold).

As illustrated in FIG. 16, in a case in which designation is made for each user name, "name" is designated as an attribute of <user> tag, and the alternative setting is designated for each user such as "name=user1" and "name=user2". As a designation method in a case in which a user name does not correspond to the designated user name, <default> tag can be designated. Accordingly, an alternative setting condition can be changed for each user.

In a case in which designation is made for each privilege, "privilege" is designated as the attribute of <user> tag, and the alternative setting is designated for each privilege such as "privilege=administrator (administrator privilege)" and "privilege=user (user privilege)". As described above with reference to FIG. 10, a plurality of alternative settings can be designated, and user notification and the like can be designated. Accordingly, it can be designated that the user having an administrator privilege uses a manual setting, and a general user uses a fixed setting, for example.

Figure 17:
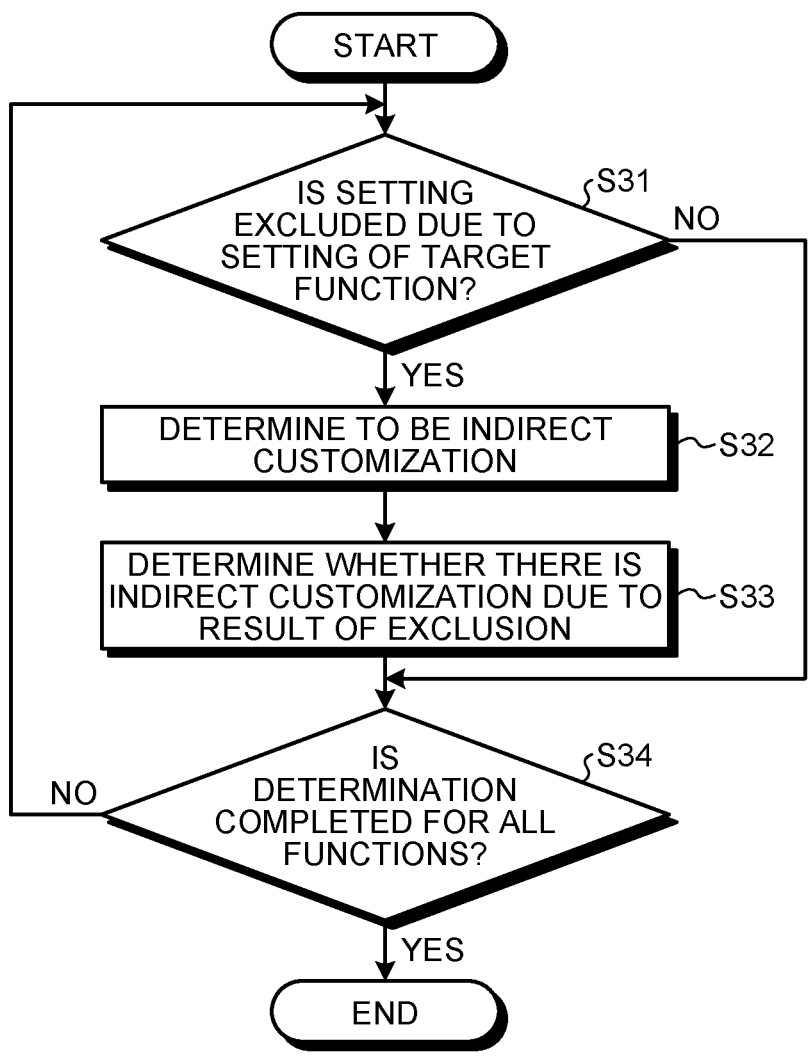
FIG. 17 is a flowchart illustrating a processing procedure of determining whether the indirect customization setting is present.

Next, the following describes an operation of determining whether there is the indirect customization setting at Step S18 in the flowchart of FIG. 9 and at Step S24 and Step S27 in the flowchart of FIG. 12 in more detail. The determining unit 29 determines whether all settings in an exclusive relation with respect to any other function of the printer driver are excluded due to the customization setting for each customization setting customized by the user, and determines that the exclusion setting is the indirect customization setting. The flowchart in FIG. 17 illustrates an operation procedure of determining whether there is the indirect customization setting for each customization setting and each printer driver setting. That is, FIG. 18 illustrates an example of all settings of the printer driver that may be excluded due to another setting. FIG. 19 illustrates an example of the customization setting by the user. The determining unit 29 determines whether the setting is excluded due to the customization setting by the user for all the settings of the printer driver illustrated in FIG. 18 for each customization setting by the user illustrated in FIG. 19.

At Step S31, the determining unit 29 determines whether any of all settings (determination function) that may be prohibited by the printer driver illustrated in FIG. 18 is excluded due to any of the customization settings (target function) customized by the user illustrated in FIG. 19. If it is determined that the determination function is not excluded (No at Step S31), at Step S34, the determining unit 29 determines whether determination whether all of determination functions are excluded is completed for all the customization settings customized by the user. If it is determined that the determination is completed (Yes at Step S34), the determining unit 29 ends the process in the flowchart of FIG. 17. If it is determined that the determination is not completed (No at Step S34), the determining unit 29 returns the process to Step S31, and determines whether the next target function or the next determination function is excluded.

At Step S31, if it is determined that the determination function is excluded (Yes at Step S31), the determining unit 29 determines that the indirect customization setting is present at Step S32. The determining unit 29 then describes the determination function determined to be the indirect customization setting in an indirect customization list.

The indirect customization setting can also be regarded as one of the customization settings. Thus, at Step S33, the determining unit 29 further determines whether there is the indirect customization setting for the determined indirect customization setting. Specifically, the determining unit 29 temporarily sets the determination function determined to be the indirect customization setting as the customization setting (=the target function described above) set by the user. The determining unit 29 determines whether the setting is excluded due to the temporarily set determination function determined to be the indirect customization setting for all the settings that may be prohibited by the printer driver illustrated in FIG. 18. The determining unit 29 then describes the determination function determined to be the indirect customization setting in the indirect customization list. The determining unit 29 also performs determination on such a recursive indirect customization setting.

More specifically, for example, a sheet classification setting of thick paper illustrated in FIG. 18 is determined to be the indirect customization setting through processing of determining whether the setting is excluded due to a customization setting of a tray illustrated in FIG. 19. In this case, the determining unit 29 temporarily sets the sheet classification setting of thick paper as the customization setting by the user at Step S33, and determines whether there is a setting excluded from the sheet classification setting of thick paper among the settings illustrated in FIG. 18. When the setting excluded from the sheet classification setting of thick paper is detected, the setting is described in the indirect customization list. In this case, a setting of sheet folding processing is detected as the setting excluded from the sheet classification setting of thick paper, and described in the indirect customization list.

Next, at Step S34, the determining unit 29 determines whether a process of determining whether the setting is excluded due to the customization setting by the user is completed for all settings in an exclusive relation with any other function of the printer driver illustrated in FIG. 18 for each customization setting by the user illustrated in FIG. 19. If it is determined that the determination is completed (Yes at Step S34), the determining unit 29 ends the process of flowchart in FIG. 17. The alternative processing described above is performed on the indirect customization setting to be invalidated among the determined indirect customization settings. If it is determined that the determination is not completed (No at Step S34), the determining unit 29 returns the process to Step S31, and determines whether the setting is excluded from the next customization setting or the next setting of the printer driver. In a case of the customization setting illustrated in FIG. 19, the determining unit 29 determines whether each of customization settings, that is, a copy guard setting→a duplex printing setting→a staple setting→a tray setting, in this order, is excluded due to all the settings of the printer driver illustrated in FIG. 18.

The following describes such an operation of determining whether the indirect customization setting is present in more detail. FIG. 18 illustrates an example of prohibition information included in the device type data described with reference to FIGS. 4 and 5. As the prohibition information, a function name, a setting (condition) of another function, and a setting (result) set corresponding to the setting of another function are stored while being associated with each other. Specifically, in the example of FIG. 18, a watermark function is fixed to be OFF when the copy guard setting is ON. The binding function is fixed to be OFF when the duplex printing function is OFF. As for the staple function, the user can select a desired setting from among "OFF" and "fixed at two positions at center" when the binding function is OFF. The staple function is fixed to be OFF when the binding function is ON (binding).

The punch function is fixed to be OFF when the staple function is set to be "fixed at two positions at center". The punch function is fixed to be OFF when the binding function is set to be OFF. A sheet classification function is fixed to be thick paper when a second tray is selected in a tray function. This means that the second tray is dedicated to thick paper. A sheet folding processing function is fixed to be OFF when the sheet classification is thick paper.

FIG. 19 illustrates the customization setting customized by the user. The customization setting in FIG. 19 exemplifies a case in which the user causes the copy guard setting to be fixed to be ON, and causes the setting range to be fixed such that a binding portion is a long side (long edge) of a sheet or a short side (short edge) of the sheet in the duplex printing setting. The customization setting in FIG. 19 exemplifies a case in which the setting range of the staple setting is fixed to be "OFF" or "fixed at two positions at center". FIG. 19 also exemplifies a case in which the tray setting is fixed to be the second tray as a tray dedicated to thick paper.

The determining unit 29 determines whether the indirect customization setting is present based on the prohibition information (FIG. 18) indicating a prohibition among the settings in the switched device type, and the customization setting (FIG. 19) customized by the user.

Specifically, when the copy guard setting is fixed to be ON as illustrated in FIG. 19, a watermark setting is turned OFF as illustrated in FIG. 18, which is an exclusive relation. Thus, at Step S31 and Step S32 in the flowchart of FIG. 17, the determining unit 29 determines that the indirect customization setting such as an OFF setting of the watermark setting is present with respect to the ON setting of the copy guard setting.

When there is a setting that is always excluded within a settable range, the determining unit 29 determines that the indirect customization setting is present. For example, as illustrated in FIG. 19, when the long edge or the short edge is set as a fixed setting range as a setting of a binding portion of the duplex printing setting, the binding portion can be set to be only one of the long edge and the short edge. A binding setting cannot be set to be ON unless the duplex printing setting is set to be OFF as illustrated in FIG. 18. Thus, when the setting range is fixed at the long edge or the short edge as the binding portion of the duplex printing setting, the binding setting is always exclusively set to be OFF. In this case, an exclusion condition for the binding setting of "the duplex printing setting is not OFF" is always satisfied at Step S31 and Step S32, so that the determining unit 29 determines that the indirect customization setting of the binding setting is present for the duplex printing setting.

When the exclusion setting is released within a settable range, the determining unit 29 does not determine that the setting is the indirect customization setting. For example, as illustrated in FIG. 19, the staple setting is assumed to be set to select any of "OFF" or "two positions at center" (fixed setting range). As illustrated in FIG. 18, when the staple setting is "two positions at center", the punch setting is set to be OFF. However, when the staple setting is set to be OFF, the exclusion setting for the punch setting is not present. In this way, when the exclusion setting is present for one of selectable settings and the exclusion setting is not present for the other one of the selectable settings, the determining unit 29 determines that the indirect customization setting is not present at Step S31 and Step S32.

As illustrated in FIG. 19, when the tray setting indicating a tray in which a sheet used for printing is stored is the second tray dedicated to thick paper, the sheet classification is fixed to be thick paper as illustrated in FIG. 18. In this case, the determining unit 29 performs recursive determination processing for further determining whether there is the indirect customization setting for a thick paper setting of the sheet classification determined to be the indirect customization setting. When the sheet classification is the thick paper setting, as illustrated in FIG. 18 for example, a sheet folding processing setting is fixed to be the OFF setting. Thus, the determining unit 29 determines that the indirect customization setting in which the sheet folding processing setting is set to be OFF is present for the thick paper setting of the sheet classification. In this example of recursive determination processing, two indirect customization settings are determined, that is, the indirect customization setting in which the sheet classification is set to be thick paper, and the indirect customization setting in which the sheet folding processing setting is set to be OFF.

The determining unit 29 performs such recursive determination processing only on a recursive target setting determined to be the indirect customization setting, returns the process to Step S31 after it is determined whether there is the indirect customization setting as the recursive target setting, and continuously determines whether there is the indirect customization setting for the next setting. The recursive determination processing may be performed again on the indirect customization setting as the recursive target setting.

As is clear from the above description, when the device type of the printer device 2 is switched, the printing system according to the embodiment refers to the information about the device type before and after the switching and the customization information. That is, the printing system refers to the prohibition information (FIG. 18) indicating a prohibition setting among the settings of the switched device type and the customization setting information (FIG. 19) indicating the customization setting customized by the user to determine whether the indirect customization setting is present. The printing system also determines whether the customization setting is invalidated. When the customization setting is invalidated, the customization solution processing is performed such as "making notification to the user, and urging the user to designate the alternative setting/invalidation" or "changing the setting to the alternative setting set in advance".

The printing system also determines whether limitation on an exclusive function that is set in association with the customization setting is released when the customization setting is invalidated. If there is the exclusive function the limitation on which is released, the customization solution processing is performed such as "making notification to the user, and urging the user to designate the alternative setting/invalidation" or "changing the setting to the alternative setting set in advance".

Accordingly, when the device type is switched, processing desired by the user can be designated if the customization setting is invalidated or the limitation on the exclusive function is released, and the problem that printing is performed with a setting not intended by the user can be prevented.

According to the present invention, an unintended printing result can be prevented from being obtained when the printing device is changed.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A non-transitory computer-readable recording medium with an executable program stored thereon, wherein the executable program instructs a computer to perform:
    changing setting data for performing print control of a first printing device to a customization setting to be stored in a storage unit;
    switching a piece of setting data used for printing among pieces of setting data of a plurality of printing devices stored in the storage unit into a piece of setting data of a second printing device instructed to be switched;
    determining whether there is at least one customization setting to be invalidated in a type of the second printing device after switching when the switching is performed, and determining whether there is at least one indirect customization setting to be released among indirect customization settings that are set in association with the at least one customization setting to be invalidated; and
    changing the at least one customization setting to be invalidated to at least one alternative customization setting, and changing the at least one indirect customization setting to be released to at least one alternative indirect customization setting.

2. The non-transitory computer-readable recording medium according to claim 1, wherein the determining includes referring to prohibition information indicating a setting to be prohibited between device types before and after the switching and customization setting information indicating the customization setting, and determining whether there is the at least one indirect customization setting to be released based on the prohibition information and the customization setting information.

3. The non-transitory computer-readable recording medium according to claim 1, wherein,
    one or more of the at least one alternative customization setting or the at least one alternative indirect customization setting is stored in advance in the storage unit, or
    one or more of the at least one alternative customization setting or the at least one alternative indirect customization setting is selected by a user when a notification about the invalidation is made.

4. The non-transitory computer-readable recording medium according to claim 3, wherein the executable program further instructs the computer to perform causing a display unit to display an alternative setting screen for selecting one or more of the at least one alternative customization setting or the at least one alternative indirect customization setting when the notification about the invalidation is made.

5. The non-transitory computer-readable recording medium according to claim 1, wherein one or more of the at least one alternative customization setting or the at least one alternative indirect customization setting includes one or more of an alternative setting for each user name of a plurality of user names or an alternative setting for each user privilege of a plurality of user privileges.

6. The non-transitory computer-readable recording medium according to claim 1, wherein,
    the determining includes determining whether there is another indirect customization setting for the at least one indirect customization setting to be released, and
    the changing includes changing the other indirect customization setting to another alternative indirect customization setting.

7. An information processing device comprising:
    a memory storing compute readable instructions; and
    a processor configured to execute the computer-readable instructions to,
        change setting data for performing print control of a first printing device to a customization setting to be stored in a storage unit;
        switch a piece of setting data used for printing among pieces of setting data of a plurality of printing devices stored in the storage unit into a piece of setting data of a second printing device instructed to be switched;
        determine whether there is at least one customization setting to be invalidated in a type of the second printing device after switching when the switching is performed, and determining whether there is at least one indirect customization setting to be released among indirect customization settings that are set in association with the at least one customization setting to be invalidated; and
        change the at least one customization setting to be invalidated to at least one alternative customization setting, and change the at least one indirect customization setting to be released to at least one alternative indirect customization setting.

8. The information processing device according to claim 7, wherein,
    one or more of the at least one alternative customization setting or the at least one alternative indirect customization setting is stored in advance in the storage unit, or
    one or more of the at least one alternative customization setting or the at least one alternative indirect customization setting is selected by a user when a notification about the invalidation is made.

9. The information processing device according to claim 8, wherein the processor is further configured to execute the computer-readable instructions to cause a display unit to display an alternative setting screen for selecting one or more of the at least one alternative setting or the at least one alternative indirect customization setting when the notification about the invalidation is made.

10. The information processing device according to claim 7, wherein one or more of the at least one alternative customization setting or the at least one alternative indirect customization setting includes one or more of an alternative setting for each user name of a plurality of user names or an alternative setting for each user privilege of a plurality of user privileges.

11. The information processing device according to claim 7, wherein the processor is further configured to execute the computer-readable instructions to,
determine whether there is another indirect customization setting for the at least one indirect customization setting to be released, and
change the other indirect customization setting to another alternative indirect customization setting.

12. The information processing device according to claim 7, wherein the determining includes referring to prohibition information indicating a setting to be prohibited between device types before and after the switching and customization setting information indicating the customization setting, and determining whether there is the at least one indirect customization setting to be released based on the prohibition information and the customization setting information.

13. An information processing system comprising:
an image processing device configured to perform image processing; and
an information processing device configured to perform information processing for controlling the image processing device, the information processing device including a memory storing computer-readable instructions and a processor configured to execute the computer-readable instructions to,
change setting data for performing print control of a first printing device to a customization setting to be stored in a storage unit;
switch a piece of setting data used for printing among pieces of setting data of a plurality of printing devices stored in the storage unit into a piece of setting data of a second printing device instructed to be switched;
determine whether there is at least one customization setting to be invalidated in a type of the second printing device after switching when the switching is performed, and determining whether there is at least one indirect customization setting to be released among indirect customization settings that are set in association with the at least one customization setting to be invalidated; and
change the at least one customization setting to be invalidated to at least one alternative customization setting, and change the at least one indirect customization setting to be released to at least one alternative indirect customization setting.

14. The information processing system according to claim 13, wherein the determining includes referring to prohibition information indicating a setting to be prohibited between device types before and after the switching and customization setting information indicating the customization setting, and determining whether there is the at least one indirect customization setting to be released based on the prohibition information and the customization setting information.

15. The information processing system according to claim 13, wherein,
one or snore of the at least one alternative customization setting or the at least one alternative indirect customization setting is stored in advance in the storage unit, or
one or more of the at least one alternative customization setting or the at least one alternative indirect customization setting is selected by a user when a notification about the invalidation is made.

16. The information processing system according to claim 15, wherein the processor is further configured to execute the computer-readable instructions to cause a display unit to display an alternative setting screen for selecting one or more of the at least one alternative setting or the at least one alternative indirect customization setting when the notification about the invalidation is made.

17. The information processing system according to claim 13, wherein one or more of the at least one alternative customization setting or the at least one alternative indirect customization setting includes one or more of an alternative setting for each user name of a plurality of user names or an alternative setting for each user privilege of a plurality of user privileges.

18. The information processing system according to claim 13, wherein the processor is further configured to execute the computer-readable instructions to,
determine whether there is another indirect customization setting for the at least one indirect customization setting to be released, and
change the other indirect customization setting to another alternative indirect customization setting.

* * * * *